(12) United States Patent
Ajisaka

(10) Patent No.: US 10,449,840 B2
(45) Date of Patent: Oct. 22, 2019

(54) VEHICLE SIDE PORTION STRUCTURE

(71) Applicant: TOYOTA JIDOSHA KABUSHIKI KAISHA, Toyota-shi (JP)

(72) Inventor: Satoshi Ajisaka, Okazaki (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 15/850,048

(22) Filed: Dec. 21, 2017

(65) Prior Publication Data

US 2018/0178636 A1    Jun. 28, 2018

(30) Foreign Application Priority Data

Dec. 22, 2016  (JP) ................... 2016-249596

(51) Int. Cl.
*B60J 5/04* (2006.01)
*B60J 5/06* (2006.01)
*B62D 21/15* (2006.01)

(52) U.S. Cl.
CPC ............ *B60J 5/0425* (2013.01); *B60J 5/047* (2013.01); *B60J 5/0455* (2013.01); *B60J 5/0458* (2013.01); *B60J 5/06* (2013.01); *B62D 21/157* (2013.01)

(58) Field of Classification Search
CPC ........ B60J 5/0412; B60J 5/042; B60J 5/0422; B60J 5/0425; B60J 5/0458; B60J 5/06
USPC ............................................. 296/146.6, 155
See application file for complete search history.

(56) References Cited

U.S. PATENT DOCUMENTS

| 4,544,198 | A | * | 10/1985 | Ochiai | .............. | B60J 5/0479 296/155 |
| 5,992,918 | A | * | 11/1999 | Gobart | .............. | B60J 5/0473 296/146.1 |
| 6,183,039 | B1 | * | 2/2001 | Kohut | .............. | E05D 15/1081 296/146.12 |
| 7,097,229 | B1 | * | 8/2006 | Chernoff | .............. | B60J 5/047 296/146.1 |

(Continued)

FOREIGN PATENT DOCUMENTS

| DE | 19824404 A1 * 12/1999 | .............. B60J 5/042 |
| JP | 9-216543 A    8/1997 | |

(Continued)

OTHER PUBLICATIONS

English translation of DE 198 44 404; reteived via PatentTranslate located at www.epo.org. (Year: 2019).*

*Primary Examiner* — Jason S Daniels
(74) *Attorney, Agent, or Firm* — Oblon, McClelland, Maier & Neustadt, L.L.P.

(57) ABSTRACT

A vehicle side portion structure includes a vehicle body side portion in which a door opening portion allowing an occupant to enter or leave a vehicle is formed, the vehicle body side portion being configured to include a center pillar dividing the door opening portion into front and rear portions, a slide door disposed such that the door opening portion is openable and closable, the slide door in a closed state being disposed across the center pillar in a front-rear direction of the vehicle, and an elongated reinforcing member disposed inside the slide door with a longitudinal direction of the reinforcing member directed in the front-rear direction of the vehicle and intersecting with the center pillar in side view of the vehicle in the state where the slide door is closed.

9 Claims, 3 Drawing Sheets

(56) References Cited

U.S. PATENT DOCUMENTS

2011/0099913 A1* 5/2011 Narayana ............... B60J 5/0427
49/506

FOREIGN PATENT DOCUMENTS

| JP | 10-258767 A | 9/1998 |
| JP | 2005-186697 A | 7/2005 |
| JP | 2007-161076 | 6/2007 |
| JP | 2013-256202 A | 12/2013 |

* cited by examiner

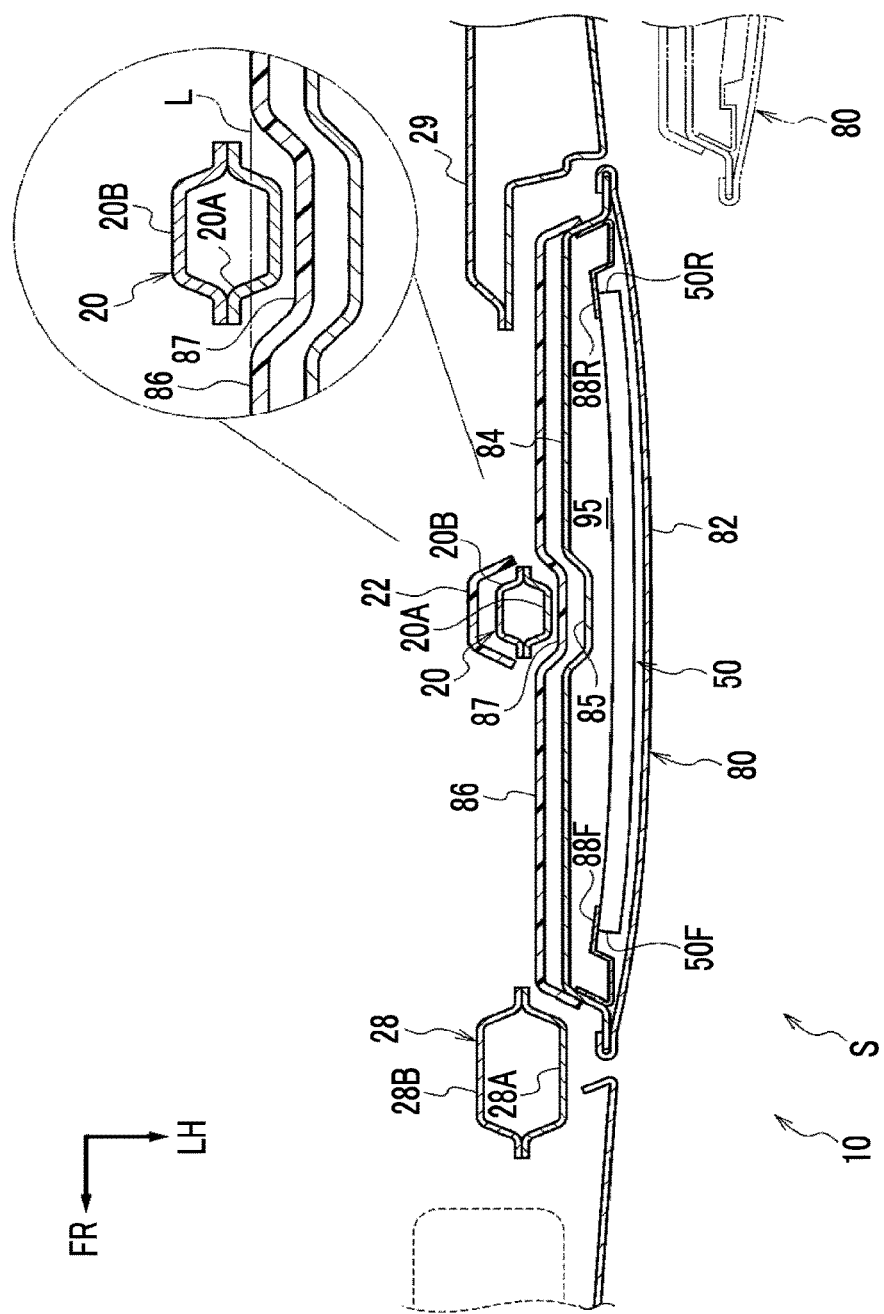

VEHICLE SIDE PORTION STRUCTURE

INCORPORATION BY REFERENCE

The disclosure of Japanese Patent Application No. 2016-249596 filed on Dec. 22, 2016 including the specification, drawings and abstract is incorporated herein by reference in its entirety.

BACKGROUND

1. Technical Field

The present disclosure relates to a vehicle side portion structure.

2. Description of Related Art

Japanese Unexamined Patent Application Publication No. 2007-161076 (JP 2007-161076 A) discloses a vehicle side portion structure that is provided with a side surface opening portion and a slide door. The side surface opening portion is for occupants sitting on the front and rear seats to enter or leave a vehicle, and the slide door is disposed such that the side surface opening portion is openable and closable. The strength of the vehicle body side surface portion of the vehicle side portion structure is ensured by a pillar member extending in the up-down direction of the vehicle being disposed in the intermediate portion of the slide door in the front-rear direction of the vehicle.

SUMMARY

The related art described above still has room for improvement with regard to improving the collision safety performance during a side collision of the vehicle.

The disclosure provides a vehicle side portion structure with which the collision safety performance during a side collision of the vehicle can be further improved.

An aspect relates to a vehicle side portion structure including a vehicle body side portion in which a door opening portion allowing an occupant to enter or leave a vehicle is formed, the vehicle body side portion being configured to include a center pillar dividing the door opening portion into front and rear portions, a slide door disposed such that the door opening portion is openable and closable, the slide door in a closed state being disposed across the center pillar in a front-rear direction of the vehicle, and a reinforcing member having an elongated shape, the reinforcing member being disposed inside the slide door with a longitudinal direction of the reinforcing member directed in the front-rear direction of the vehicle (in the present specification, "in the front-rear direction of the vehicle" also means "substantially in the front-rear direction of the vehicle") and intersecting with the center pillar in side view of the vehicle in the state where the slide door is closed.

According to the aspect, the door opening portion that allows an occupant to enter or leave the vehicle is divided in the vehicle body side portion constituting a side portion of a vehicle body. The vehicle body side portion is configured to include the center pillar, and the door opening portion is divided into the front and rear portions by the center pillar. The slide door is disposed such that the door opening portion is openable and closable, and the slide door in the closed state is disposed across the center pillar in the front-rear direction of the vehicle. In addition, the elongated reinforcing member is disposed inside the slide door. The reinforcing member is disposed with its longitudinal direction directed in the front-rear direction of the vehicle, and the reinforcing member intersects with the center pillar in side view of the vehicle in the state where the slide door is closed. Accordingly, when a side collision occurs, the collision load that is applied to the slide door is dispersed in the front-rear direction by the elongated reinforcing member. In addition, the collision load is transmitted to the center pillar intersecting with the elongated reinforcing member in side view of the vehicle and is dispersed in an up-down direction by the center pillar. According to the aspect, the collision load resulting from the side collision can be dispersed to a relatively significant extent as described above, and thus the collision safety performance during the side collision can be further improved.

In the vehicle side portion structure according to the aspect, a size of a cross section of the center pillar orthogonal to the up-down direction of the vehicle at a height at which the center pillar and the reinforcing member intersect with each other in side view of the vehicle may be smaller than a size of a cross section of a front pillar orthogonal to the up-down direction of the vehicle at the height at which the center pillar and the reinforcing member intersect with each other in side view of the vehicle, the front pillar being disposed in front of the door opening portion.

According to the aspect, the size of the cross section of the center pillar orthogonal to the up-down direction of the vehicle at the height at which the center pillar and the reinforcing member intersect with each other in side view of the vehicle (closed cross-sectional area) is smaller than the size of the cross section of the front pillar orthogonal to the up-down direction of the vehicle at the height at which the center pillar and the reinforcing member intersect with each other in side view of the vehicle (closed cross-sectional area), the front pillar being disposed in front of the door opening portion. Accordingly, an increase in the dimension of the vehicle in the width direction of the vehicle can be further suppressed in the vehicle side portion structure in which the slide door is disposed across the center pillar.

In the vehicle side portion structure according to the aspect, a recessed portion may be formed in a surface of the slide door on a vehicle cabin side, at least a part of the center pillar being positioned in the recessed portion in the state where the slide door is closed.

According to the aspect, the recessed portion is provided in the surface of the slide door that is on the vehicle cabin side. In the state where the slide door is closed, at least a part of the center pillar is positioned in the recessed portion. Accordingly, in the state where the slide door is closed, the distance between the center pillar and the reinforcing member in the width direction of the vehicle can be reduced compared to a case where the recessed portion is not provided. As a result, the collision load can be dispersed early after the occurrence of the collision.

In the vehicle side portion structure according to the aspect, the recessed portion may extend in the up-down direction of the vehicle.

In the vehicle side portion structure according to the aspect, a front end and a rear end of the reinforcing member may overlap the vehicle body side portion in side view of the vehicle in the state where the slide door is closed.

According to the aspect, the reinforcing member intersects with the center pillar and the front end and the rear end of the reinforcing member overlap the vehicle body side portion in side view of the vehicle in the state where the slide door is closed. Accordingly, the collision load dispersed in the front-rear direction by the reinforcing member during the side collision can be effectively transmitted to the vehicle body via the vehicle body side portion.

In the vehicle side portion structure according to the aspect, the slide door may include a door outer panel disposed on an outermost side of the slide door in the width direction of the vehicle, a door inner panel disposed on an inner side of the door outer panel in the width direction of the vehicle, and a door trim disposed on an inner side of the door inner panel in the width direction of the vehicle. The reinforcing member may be disposed in a door interior space formed by the door outer panel and the door inner panel.

In the vehicle side portion structure according to the aspect, the front end of the reinforcing member in the front-rear direction of the vehicle may be installed in a front portion of the door inner panel and the rear end of the reinforcing member in the front-rear direction of the vehicle may be installed in a rear portion of the door inner panel.

With the aspect, the collision safety performance during a side collision can be further improved as described above.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 1 is an enlarged sectional plan view illustrating the structure around a slide door of a vehicle to which a vehicle side portion structure according to an embodiment is applied (cross-sectional view taken along line I-I of FIG. 2A);

DETAILED DESCRIPTION OF EMBODIMENTS

Hereinafter, a vehicle 10 to which a vehicle side portion structure S according to an embodiment is applied will be described with reference to FIGS. 1 to 3. The arrows FR, UP, LH, and RH that are appropriately shown in each of the drawings represent the front of the vehicle, the top of the vehicle, the left side in the width direction of the vehicle, and the right side in the width direction of the vehicle, respectively. The front-rear, up-down, and right-left directions mentioned in the following description respectively represent the front and rear in the front-rear direction of the vehicle, the top and bottom in the up-down direction of the vehicle, and the right and left in the width direction of the vehicle unless otherwise noted.

Figure 3:
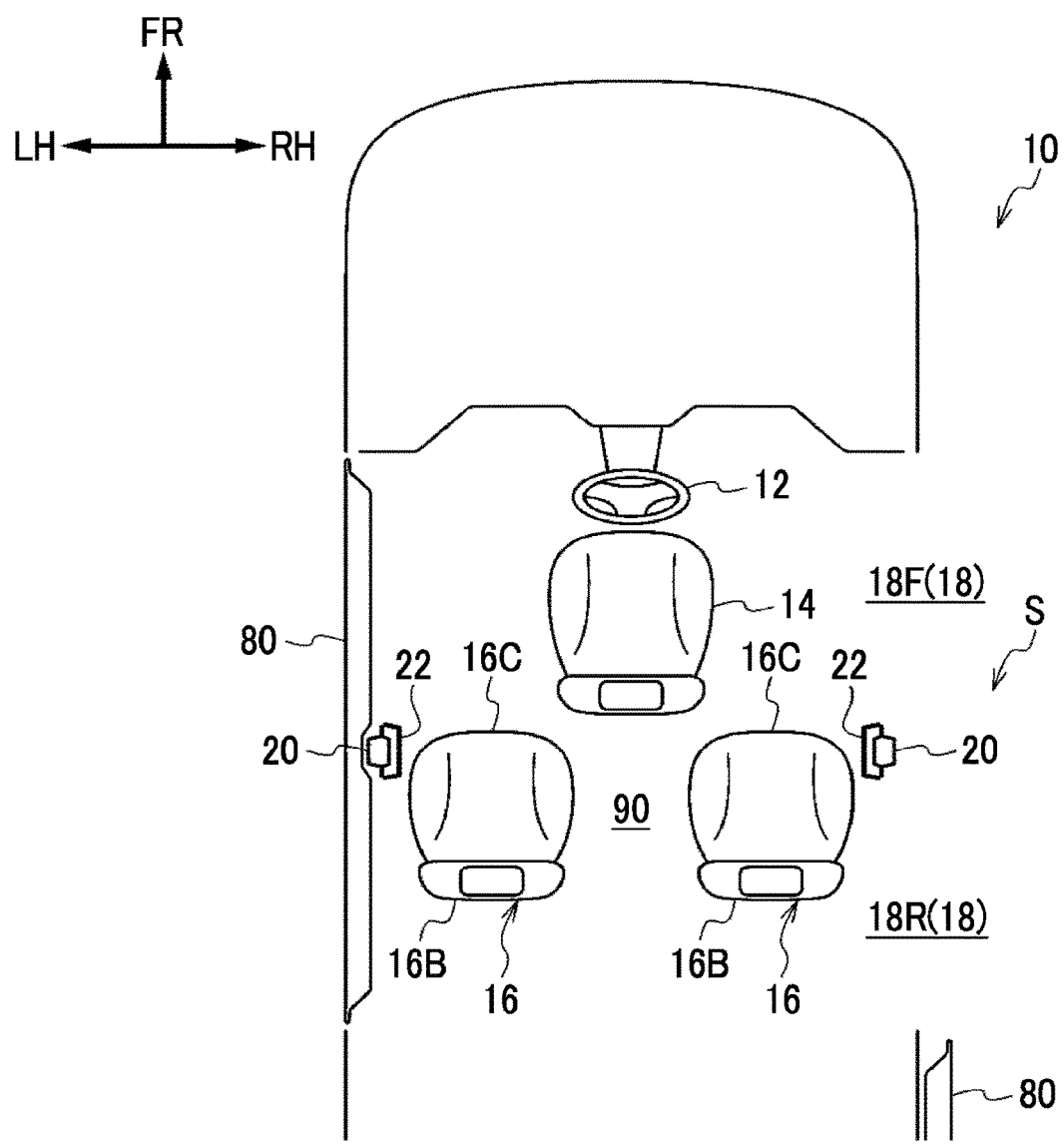
FIG. 3 is a schematic sectional plan view illustrating a schematic configuration of the vehicle.

FIG. 3 is a schematic sectional plan view illustrating a schematic configuration of the vehicle 10. In the vehicle 10, a steering wheel 12 is disposed in the middle of a vehicle cabin 90 in the width direction of the vehicle as illustrated in FIG. 3. A driver's seat 14 is disposed behind the steering wheel 12. In other words, the driver's seat 14 is disposed in the middle in the width direction of the vehicle and the vehicle 10 has no passenger seat. The driver's seat 14 has a built-in seat belt winding device (not illustrated). No seat belt winding device is disposed in a pair of right and left center pillars 20 (described later) in this regard.

A pair of right and left second row seats 16 is disposed behind the driver's seat 14. The left second row seat 16 is disposed at a position shifted to the left side with respect to the middle in the width direction of the vehicle, and the right second row seat 16 is disposed at a position shifted to the right side with respect to the middle in the width direction of the vehicle. As a result, the vehicle 10 has a configuration in which no first row seat such as the driver's seat 14 and a passenger seat is disposed in front of the second row seats 16. A third row seat (not illustrated) is disposed behind the second row seats 16.

A pair of right and left door opening portions 18 is disposed on both right and left sides of the vehicle cabin 90 so that an occupant can enter or leave the vehicle 10 (for convenience of illustration, the reference sign is attached to the door opening portion 18 that is on the right side of the vehicle cabin 90 and no reference sign is attached to the door opening portion 18 that is on the left side of the vehicle cabin 90). The center pillars 20 extending substantially in the up-down direction of the vehicle are disposed such that the door opening portions 18 are divided into front and rear portions. As a result, the door opening portions 18 are divided into front side door opening portions 18F and rear side door opening portions 18R. In side view of the vehicle, the center pillar 20 is disposed at a position ahead of a seat back 16B of the second row seat 16. More specifically, the center pillar 20 is disposed at a position overlapping the front portion of a seat cushion 16C.

As illustrated in FIG. 1, the center pillar 20 is configured to include an outer panel 20A constituting its outer side in the width direction of the vehicle and an inner panel 20B constituting its inner side in the width direction of the vehicle. The outer panel 20A and the inner panel 20B have a hat-shaped cross section alike. The center pillar 20 extending substantially in the up-down direction of the vehicle with a closed cross-sectional structure is formed by the flanges of the outer panel 20A and the inner panel 20B being joined to each other.

A center pillar garnish 22 (hereinafter, abbreviated as a center pillar GN 22) is disposed on the inner side of the center pillar 20 in the width direction of the vehicle. The center pillar GN 22 has a substantially C-shaped cross section and is open to the outer side in the width direction of the vehicle. The center pillar GN 22 is installed to cover the center pillar 20 from the vehicle cabin side and hide the center pillar 20.

Figure 2A:
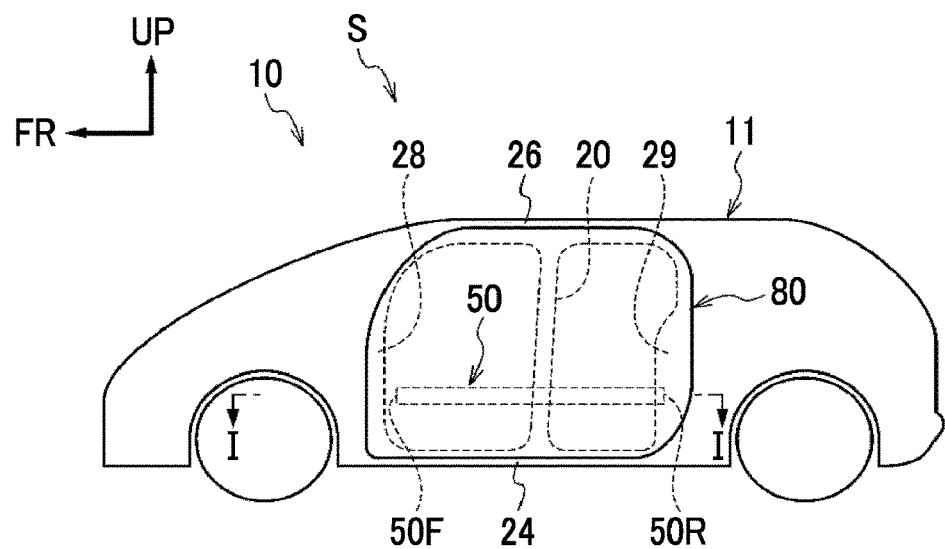
FIG. 2A is a side view of the vehicle in a state where the slide door is closed.
Figure 2B:
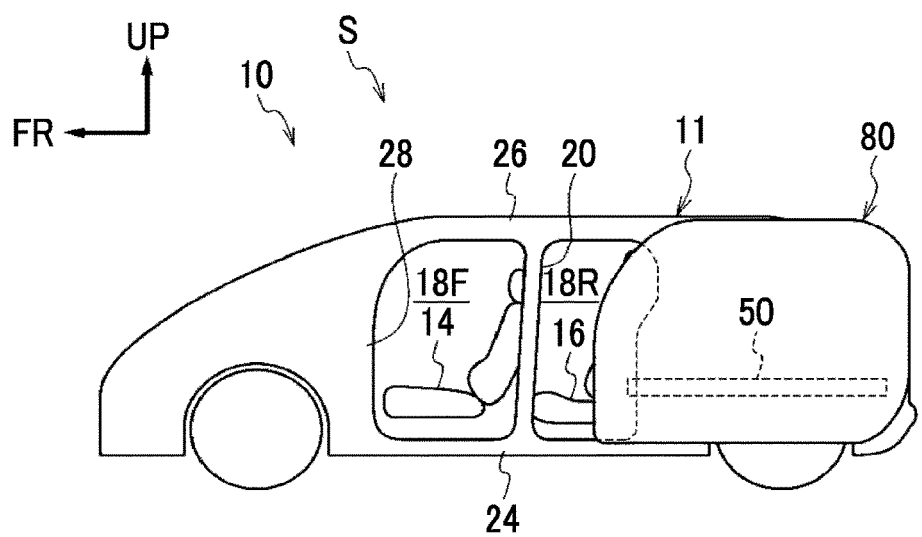
FIG. 2B is a side view of the vehicle in a state where the slide door is open.

FIGS. 2A and 2B are side views of the vehicle 10. As illustrated in FIGS. 2A and 2B, a rocker 24 is connected to the lower ends of the center pillars 20. The rocker 24 is a skeleton member extending in the front-rear direction of the vehicle in the lower portion of the body of the vehicle and both end portions of the vehicle body in the width direction of the vehicle. The rocker 24 constitutes the lower portions of the front side door opening portions 18F and the rear side door opening portions 18R.

A roof side rail 26 is connected to the upper ends of the center pillars 20. The roof side rail 26 is a skeleton member extending in the front-rear direction of the vehicle in the upper portion of the vehicle body and both end portions of the vehicle body in the width direction of the vehicle. The roof side rail 26 constitutes the upper portions of the front side door opening portions 18F and the rear side door opening portions 18R.

Front pillars 28 are disposed to connect the front end portion of the rocker 24 and the front end portion of the roof side rail 26 to each other in the up-down direction. As illustrated in FIG. 1, the front pillar 28 has a closed cross-sectional structure by an outer panel 28A and an inner panel 28B, which have a hat shape alike, being joined to each other. The front pillar 28 is positioned on the front side of the front side door opening portion 18F. Rear pillars 29 are disposed to connect the rear end portion of the rocker 24 and the rear end portion of the roof side rail 26 to each other in the up-down direction. The rear pillar 29 is positioned on the rear side of the rear side door opening portion 18R. The center pillar 20, the rocker 24, the roof side rail 26, the front pillar 28, the rear pillar 29, and the like constitute a side portion of the vehicle body (hereinafter, referred to as a "vehicle body side portion 11").

A pair of right and left slide doors 80 is disposed such that the door opening portions 18 are openable and closable. The slide door 80 is large in size so that the front side door opening portion 18F and the rear side door opening portion 18R can be blocked by the single door instead of being disposed such that the front side door opening portion 18F and the rear side door opening portion 18R are separately openable and closable. Accordingly, the slide doors 80 in a fully closed state are disposed across the center pillars 20 such that the front side door opening portions 18F and the rear side door opening portions 18R are blocked.

FIG. 1 is a cross-sectional view taken along line I-I of FIG. 2A. In other words, FIG. 1 is a cross-sectional view showing the vicinity of the slide door 80 of the vehicle 10 in an enlarged form from the cross section that is perpendicular to the up-down direction of the vehicle. As illustrated in FIG. 1, the slide door 80 is configured to include a door outer panel 82, a door inner panel 84, and a door trim 86. The door outer panel 82 is the member that is on the outermost side of the slide door 80 in the width direction of the vehicle. The door inner panel 84 is disposed on the inner side of the door outer panel 82 in the width direction of the vehicle. The door trim 86 is disposed on the inner side of the door inner panel 84 in the width direction of the vehicle.

The outer edge portion of the door outer panel 82 and the outer edge portion of the door inner panel 84 are coupled with each other by so-called hemming coupling (FIG. 1 merely shows hemming coupling between front and rear edge portions thereof). As a result, a door interior space 95 is formed between the door outer panel 82 and the door inner panel 84. Various door interior parts (not illustrated) as well as an impact beam 50 (described later) are disposed in the door interior space 95. Service holes (not illustrated) are formed in the door inner panel 84 in a state where the door outer panel 82 and the door inner panel 84 are coupled with each other. The service holes are for the door interior parts to be installed in the door interior space 95.

The impact beam 50 as a "reinforcing member" is disposed in the door interior space 95. The impact beam 50 is made of steel and has a pipe shape. A first end portion of the impact beam 50 in its longitudinal direction (front end 50F) is installed in the front portion of the door inner panel 84 via a front side extension 88F. A second end portion of the impact beam 50 in its longitudinal direction (rear end 50R) is installed in the rear portion of the door inner panel 84 via a rear side extension 88R. As a result, the impact beam 50 is disposed inside the slide door 80 with the longitudinal direction of the impact beam 50 directed in the front-rear direction of the vehicle. In side view of the vehicle in a state where the slide door 80 is closed, the impact beam 50 intersects with the center pillar 20 as illustrated in FIG. 2A. The height at which the impact beam 50 is disposed is substantially equivalent to the middle between the lower end of the slide door 80 and a door belt line (not illustrated).

The door trim 86 is installed such that the door inner panel 84 is covered from the inner side in the width direction of the vehicle (vehicle cabin side). The door trim 86 functions as an interior material. The surface of the door trim 86 that is on the vehicle cabin side is an example of the "surface of the slide door on the vehicle cabin side".

A recessed portion 87 is formed in the surface of the door trim 86 that is on the vehicle cabin side. The recessed portion 87 is recessed toward the outer side in the width direction of the vehicle. The recessed portion 87 is formed to extend substantially in the up-down direction of the vehicle. The position where the recessed portion 87 is disposed overlaps the center pillar 20 in side view of the vehicle in a state where the slide door 80 is closed. In a state where the slide door 80 is closed, a part of the center pillar 20 is positioned in the recessed portion 87. Specifically, assuming a virtual plane connecting the front and rear surfaces of the door trim 86 that are on the vehicle cabin side across the recessed portion 87 (refer to the two-dot chain line L), a part of the outer panel 20A of the center pillar 20 is positioned outside the virtual plane in the width direction of the vehicle as magnified in FIG. 1.

In the door inner panel 84, a recessed portion 85 is formed at its position corresponding to the recessed portion 87 of the door trim 86, that is, outside the recessed portion 87 in the width direction of the vehicle. As a result, the door trim 86 does not interfere with the door inner panel 84 at the part corresponding to the recessed portion 87 of the door trim 86.

The slide door 80 of the vehicle 10 according to the present embodiment has no power window switch allowing a driver or the like to perform opening and closing operations on the power window (not illustrated) in the slide door 80. In the vehicle 10 according to the present embodiment, a power window switch is disposed on an instrument panel or the like instead. Likewise, the slide door 80 has no door armrest formed to protrude to the vehicle cabin side.

Action and Effect

The action and effect of the vehicle side portion structure S according to the present embodiment will be described below.

In the present embodiment, the door opening portion 18 that allows an occupant to enter or leave the vehicle 10 is formed in the vehicle body side portion 11 constituting the side portion of the vehicle body as illustrated in FIGS. 2A and 2B. The vehicle body side portion 11 is configured to include the center pillar 20, and the door opening portion 18 is divided into the front and rear portions by the center pillar 20. The slide door 80 is disposed such that the door opening portion 18 is openable and closable, and the slide door 80 in a closed state is disposed across the center pillar 20. In addition, the impact beam 50 is disposed inside the slide door 80. The impact beam 50 is disposed with its longitudinal direction directed in the front-rear direction of the vehicle, and the impact beam 50 intersects with the center pillar 20 as illustrated in FIG. 2A in side view of the vehicle in a state where the slide door 80 is closed. Accordingly, when a side collision occurs, the collision load that is input to the slide door 80 is dispersed in the front-rear direction by the impact beam 50. In addition, the collision load is transmitted to the center pillar 20 intersecting with the impact beam 50 in side view of the vehicle and is dispersed in the up-down direction by the center pillar 20.

In the present embodiment, the impact beam 50 inside the slide door 80 intersects with the center pillar 20 in side view of the vehicle as described above. Accordingly, the collision load resulting from the side collision is efficiently dispersed in the front-rear direction of the vehicle. As a result, the strength that the center pillar 20 needs when a side collision is assumed can be further reduced. Accordingly, in the present embodiment, the center pillar 20 is designed to be smaller in cross-sectional shape than in a vehicle according to the related art (examples including a vehicle in which a door is set with respect to each of the front side door opening portion 18F and the rear side door opening portion 18R and its impact beam and center pillar do not intersect with each other in side view of the vehicle). As a result, the size of the cross section that is illustrated in FIG. 1, that is, the cross section of the center pillar 20 orthogonal to the up-down direction of the vehicle at the height at which the center pillar 20 and the impact beam 50 intersect with each other in side view of the vehicle, is smaller than the size of the cross section of the front pillar 28 orthogonal to the up-down direction of the vehicle at the height at which the center pillar 20 and the impact beam 50 intersect with each other in side view of the vehicle. More specifically, the cross section of the center pillar 20 is smaller than the cross section of the front pillar 28 both in dimension in the width direction of the vehicle and in dimension in the front-rear direction of the vehicle.

In the present embodiment, the size of the cross section of the center pillar 20 orthogonal to the up-down direction of the vehicle at the height at which the center pillar 20 and the impact beam 50 intersect with each other in side view of the vehicle (size of the closed section) is smaller than the size of the cross section of the front pillar 28 orthogonal to the up-down direction of the vehicle at the height at which the center pillar 20 and the impact beam 50 intersect with each other in side view of the vehicle as described above. Accordingly, an increase in the dimension of the vehicle 10 in the width direction of the vehicle can be further suppressed even in the vehicle 10 according to the present embodiment in which the slide door 80 is disposed across the center pillar 20. In addition, the dimension of the center pillar 20 in the front-rear direction of the vehicle is smaller than in the vehicle according to the related art, and thus the occupant can enter or leave the vehicle 10 from the door opening portion 18 with reliability.

In the present embodiment, the recessed portion 87 is formed in the surface of the slide door 80 that is on the vehicle cabin side. In a state where the slide door 80 is closed, at least a part of the center pillar 20 is positioned in the recessed portion 87. Accordingly, in a state where the slide door 80 is closed, the distance between the center pillar 20 and the impact beam 50 in the width direction of the vehicle can be reduced compared to a case where the recessed portion 87 is not formed. As a result, the collision load can be dispersed early after the occurrence of a side collision.

Supplementary Description of Embodiment

In the present embodiment described above, the front end 50F of the impact beam 50 does not overlap the front pillar 28 (vehicle body side portion 11) and the rear end 50R of the impact beam 50 overlaps the rear pillar 29 (vehicle body side portion 11), as illustrated in FIGS. 1 and 2A, in side view of the vehicle in a state where the slide door 80 is closed. Alternatively, the front end 50F and the rear end 50R of the impact beam 50 may overlap the vehicle body side portion 11 in side view of the vehicle in a state where the slide door 80 is closed. In this case, the impact beam 50 intersects with the center pillar 20 and the front end 50F and the rear end 50R of the impact beam 50 overlap the vehicle body side portion 11 in side view of the vehicle in a state where the slide door 80 is closed, and thus the collision load dispersed in the front-rear direction by the impact beam 50 during a side collision is easily transmitted to the vehicle body side portion 11.

In the embodiment described above, the longitudinal direction of the impact beam 50 as an example of the "reinforcing member" is directed in the front-rear direction of the vehicle. For example, the longitudinal direction of the reinforcing member may be slightly inclined such that its front end has a higher position than its rear end. In other words, the longitudinal direction of the reinforcing member may be directed substantially in the front-rear direction of the vehicle.

In the embodiment described above, the recessed portion 85 corresponding to the recessed portion 87 of the door trim 86 is formed in the door inner panel 84. However, the recessed portion 85 may not be formed in the door inner panel 84.

In the embodiment described above, a part of the outer panel 20A of the center pillar 20 is positioned in the recessed portion 87 disposed in the surface of the door trim 86 that is on the vehicle cabin side as illustrated in FIG. 1. However, the entire outer panel 20A of the center pillar 20 may be positioned in the recessed portion 87.

In the embodiment described above, the impact beam 50 as an example of the "reinforcing member" is made of steel and has a pipe shape. However, the "reinforcing member" is not limited thereto. It may be made of another metal such as aluminum or fiber-reinforced plastic. In addition, the "reinforcing member" may have the shape of a solid bar or any other shape instead of a shape with a cavity such as the pipe shape.

What is claimed is:

1. A vehicle side portion structure comprising:
    a vehicle body side portion in which a door opening portion allowing an occupant to enter or leave a vehicle is formed, the vehicle body side portion being configured to include a center pillar dividing the door opening portion into a front side door opening portion and a rear side door opening portion when a slide door is in an open state;
    the slide door disposed such that the door opening portion is openable and closable, the slide door in a closed state being disposed across the center pillar in a front-rear direction of the vehicle, the slide door being movable in the front-rear direction of the vehicle; and
    a reinforcing member having an elongated shape, the reinforcing member being disposed inside the slide door with a longitudinal direction of the reinforcing member directed in the front-rear direction of the vehicle, and the reinforcing member intersecting with the center pillar in side view of the vehicle in the state where the slide door is closed.

2. The vehicle side portion structure according to claim 1, wherein a size of a cross section of the center pillar orthogonal to an up-down direction of the vehicle at a height at which the center pillar and the reinforcing member intersect with each other in side view of the vehicle is smaller than a size of a cross section of a front pillar orthogonal to the up-down direction of the vehicle at the height at which the center pillar and the reinforcing member intersect with each other in side view of the vehicle, the front pillar being disposed in front of the door opening portion.

3. The vehicle side portion structure according to claim 1, wherein a recessed portion is provided in a surface of the slide door on a vehicle cabin side, at least a part of the center pillar being positioned in the recessed portion in the state where the slide door is closed.

4. The vehicle side portion structure according to claim 3, wherein the recessed portion extends in an up-down direction of the vehicle.

5. The vehicle side portion structure according to claim 1, wherein a front end and a rear end of the reinforcing member overlap the vehicle body side portion in side view of the vehicle in the state where the slide door is closed.

6. The vehicle side portion structure according to claim 1, wherein:

the slide door includes a door outer panel disposed on an outermost side of the slide door in a width direction of the vehicle, a door inner panel disposed on an inner side of the door outer panel in the width direction of the vehicle, and a door trim disposed on an inner side of the door inner panel in the width direction of the vehicle; and the reinforcing member is disposed in a door interior space defined by the door outer panel and the door inner panel.

7. The vehicle side portion structure according to claim 6, wherein:

a front end of the reinforcing member in the front-rear direction of the vehicle is attached to a front portion of the door inner panel; and a rear end of the reinforcing member in the front-rear direction of the vehicle is attached to a rear portion of the door inner panel.

8. The vehicle side portion structure according to claim 1, wherein an upper end of the center pillar is connected to a roof side rail of the vehicle, the roof side rail extending in the front-rear direction of the vehicle and constituting upper portions of the front side door opening portion and the rear side door opening portion.

9. The vehicle side portion structure according to claim 1, wherein the center pillar includes an outer panel constituting an outer side of the center pillar in a width direction of the vehicle and an inner panel constituting an inner side of the center pillar in the width direction of the vehicle, each of the outer panel and inner panel presenting a hat-shaped cross section, and the center pillar extending in an up-down direction of the vehicle with a closed cross-sectional structure formed by flanges of the outer panel and the inner panel being joined to each other.

* * * * *